TAPE TRANSPORT CONTROL MECHANISM

Filed Sept. 3, 1963 2 Sheets-Sheet 1

INVENTORS
STEN R. GERFAST
SHELDON LEE PASTOR
BY
Carpenter, Abbott, Coulter & Kinney
ATTORNEYS

TAPE TRANSPORT CONTROL MECHANISM

Filed Sept. 3, 1963 2 Sheets-Sheet 2

INVENTORS
STEN R. GERFAST
SHELDON LEE PASTOR
BY
Carpenter, Abbott, Coulter & Kinney
ATTORNEYS

United States Patent Office 3,288,386
Patented Nov. 29, 1966

3,288,386
TAPE TRANSPORT CONTROL MECHANISM

Sten R. Gerfast and Sheldon Lee Pastor, St. Paul, Minn., assignors to Minnesota Mining and Manufacturing Company, St. Paul, Minn., a corporation of Delaware Filed Sept. 3, 1963, Ser. No. 305,983
9 Claims. (Cl. 242—55.12)

This invention relates to improvements in sound recording and/or reproducing devices and in one aspect, the drive mechanism for such devices.

The most popular recording medium today is magnetic tape, although magnetic wire is sometimes used. For convenience, however, the present invention will be described with reference to a recorder-reproducer for magnetic tape.

A tape recorder is generally provided with means affording different record-reproducing drive speeds for the tape. When recording music the faster tape speeds provide a good high fidelity recording and response as the tape will pick up the high frequency sounds. For recording speech the requirements are less stringent and a much slower recording speed may be used. Present recorders however all have very complicated and expensive drive systems to provide different tape speeds. These complicated drive systems are a continual source of mechanical problems. Additionally, the present recording machines generally, lack public appeal because they are not provided with sufficient safety devices and have caused trouble, such as breaking the tape, distorting the tape as by stretching, or spilling of the tape from one of the reels during operation.

Most tape recorders are also provided with search means for advance and rewind of the tape at a comparatively rapid speed. Few machines, however, are provided with alternative advance and rewind speeds corresponding to the change in recording speed.

The present invention provides many advantages lacking, heretofore, on commercial recording machines. The present invention provides an especially trouble free drive mechanism and one which is uncomplicated from the standpoint of its mechanical parts.

A recorder incorporating the present invention is especially useful as it provides four or more tape transport speeds during the record-reproduce function without complicating the switching mechanism.

The present invention further provides variable advance and rewind speeds permitting a slower search speed when using the machine for dictation to allow reversal of only a small portion of the recording, so it can be played back or allows the operator to select a more rapid search speed at any time during operation thereof.

Further, the present invention affords safety features to remove the likelihood of improper and damaging operation of the machine which often has a very deleterious effect on the tape causing, in some instances, irreparable loss of a recording.

The novel features of this invention will be more apparent upon a perusal of the following detailed description hereof which refers to the accompanying drawing wherein.

Figure 1:
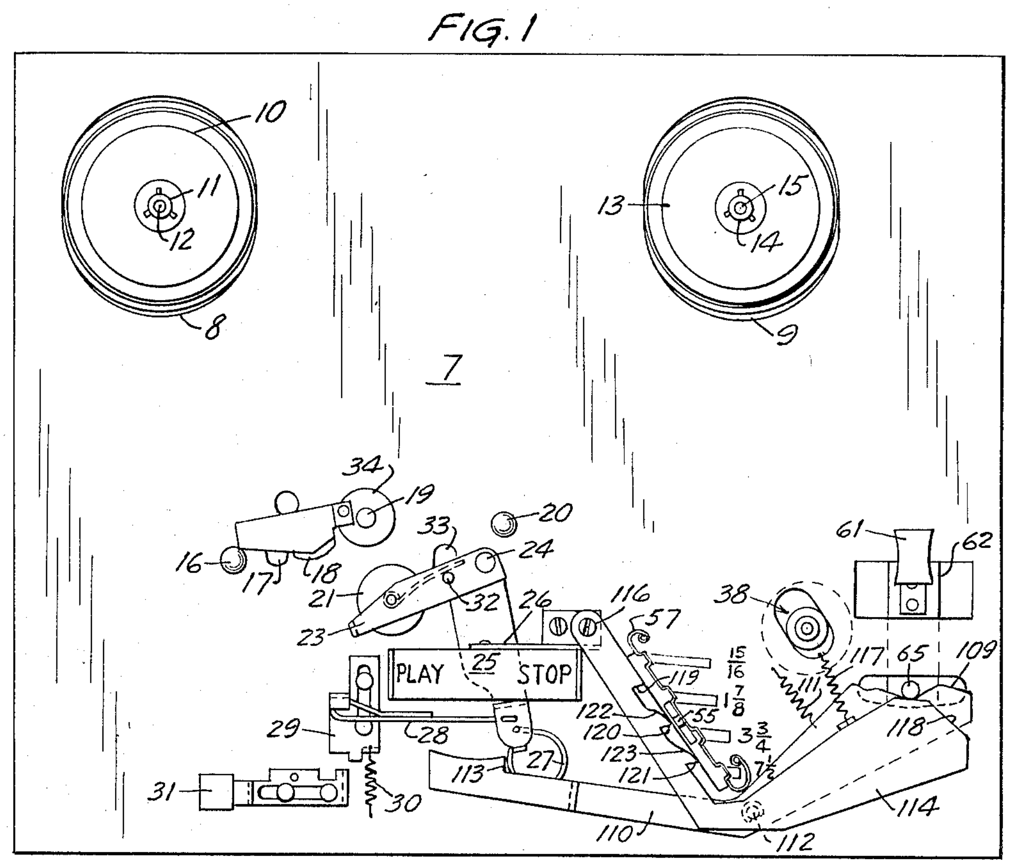
FIGURE 1 is a plan view of the upper deck of a tape recorder, certain trim panels and shields being removed for convenience.

Referring now to the drawing, the illustrated tape recorder-reproducer embodying the present invention comprises a general supporting frame having a bilevel bottom deck 6 of sheet metal, a top deck 7 of sheet metal and support posts or spacers (not shown) therebetween positioning said decks in rigid parallel spaced relationship. The top deck 7 is formed with two enlarged slotted openings 8 and 9. The opening 8 receives therethrough the upper portion of the storage or supply reel-supporting roller 10 having fixed centrally thereto and rotatable therewith a spindle 11 on which a supply reel is adapted to be mounted. The supply reel roller 10 is suitably journalled on a shaft 12. The opening 9 receives a takeup reel-supporting roller 13 which has a spindle 14 fixed centrally thereto and projecting therefrom to support a tape takeup reel in the plane of the supply reel. The takeup reel roller 13 is journalled on a shaft 15.

In normal operation the tape is threaded from the supply reel, on which it is wound counter-clockwise, to a first tape guide 16 on the deck 7, past an erase head 17, play and/or record head 18, past a capstan shaft 19 and a tape guide 20 to the takeup reel on which it is wound clockwise. The capstan 19 drives the tape past the head 18 during the record-reproduce function with the cooperation of a resilient pressure roller 21.

The pressure roller 21 is mounted on a rotatably supported shaft 22 rotatably mounted in one end of a bell crank lever 23, which is channel-shaped in cross-section and is pivotally mounted on pin 24 fixed to the deck 7. The pressure roller 21 is moved into and out of tape driving engagement with the capstan 19 by a tilting stop-play key 25 supported centrally thereof on a bracket 26. The lever 23 is held in its engaged or disengaged position by an overcenter spring 27 connected to the end of said lever opposite the pressure roller 21 and to the deck 7.

Movement of the key 25 also actuates a rod 28 which is joined to the end of the lever 23 adjacent the spring 27, affording substantially reciprocatory movement for said rod to control a locking plate 29 which is slidably supported on the deck 7. The locking plate 29 is biased by a spring 30 toward engagement with a record control push button 31 to prevent movement of said button 31 when the pressure roller is in tape driving engagement with the capstan 19 and said button is in either the off-play position or the on-record position.

Movement of the pressure roller support lever 23 also controls the brake means for the reel-supporting rollers 10 and 13 and a clutch actuating arm 97, to be hereinafter described, by moving a pin 32 projecting through a slotted opening 33 in the deck 7 and joined to the lever 23 adjacent the pressure roller 21.

The capstan 19 is rotatably supported in deck 7 by a bearing 34 and is supported in deck 6 by an end bearing 35. Capstan shaft 19 has a flywheel 36 fixedly mounted thereon, which is positioned between the decks 6 and 7. Additionally, the capstan shaft 19 has a belt pulley 37 affixed thereto between the flywheel 36 and deck 6. As previously mentioned the capstan 19 drives the tape and the rate of tape travel is highly critical, and therefore the drive to the capstan must be accurate. The illustrated apparatus is provided with variable speed drive means to provide an accurate tape transport rate of $1\frac{5}{16}$ $1\frac{7}{8}$, $3\frac{3}{4}$ or $7\frac{1}{2}$ inches per second by simply moving a mechanical control. The rapid speeds for advance and rewind can also be varied by the operation of the mechanical control.

The illustrated drive means comprises a drive roller 38 having stepped, coaxial, cylindrical drive surfaces 39, 40, 41 and 42. Each of the drive surfaces are of different diameter and are joined by conoidal surface portions which permit the roller 38 to be moved easily relative to a friction coupling or idler wheel 43, which is at least partially formed of rubber-like material and beveled along its lower peripheral edge. The idler wheel 43 is floatably mounted, as will hereinafter be described, for driving engagement selectively with a driving surface 39, 40, 41 or 42 of the drive roller 38 and with the flywheel 36. In each driving position of the idler wheel 43, it will contact the flywheel 36 and drive roller 38 such that a line between the center of the flywheel 36 and the center of the idler wheel 43 and another line between the center of the idler wheel 43 and the center of the drive roller 38 will define an obtuse engaging angle which is preferably the optimum angle for driving engagement of said rollers. The angle that provides the torque transmission required without tending to wedge the floating idler wheel can be determined. This angular relation depends upon the resilience of the materials forming the drive elements and the coefficients of friction of said elements. In the illustrated embodiment the preferred angle is about 126° and to maintain a constant tape transport speed at each position of the drive roller it is critical that the movement of the motor be such that the same optimum angle between the lines joining the centers of the drive members be substantially maintained.

Figures 3, 6:
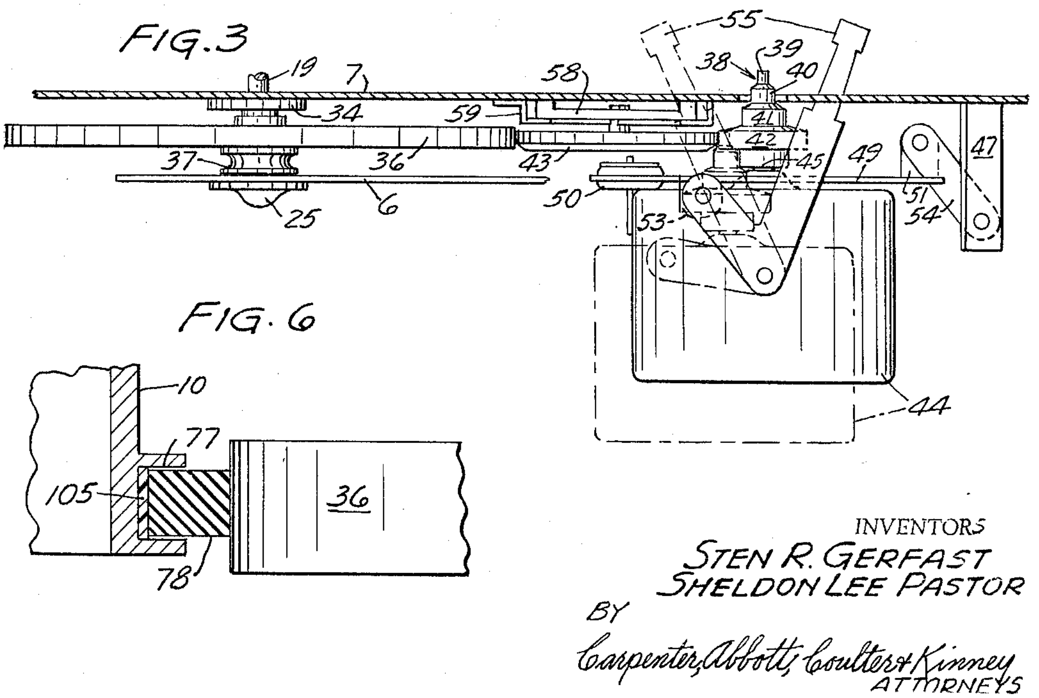
FIGURE 3 is a view taken generally along the line 3—3 of FIGURE 2 showing the drive members in elevation instead of in section.
FIGURE 6 is a fragmentary sectional view on an enlarged scale of one of the reel-supporting rollers.
Figures 2, 4:
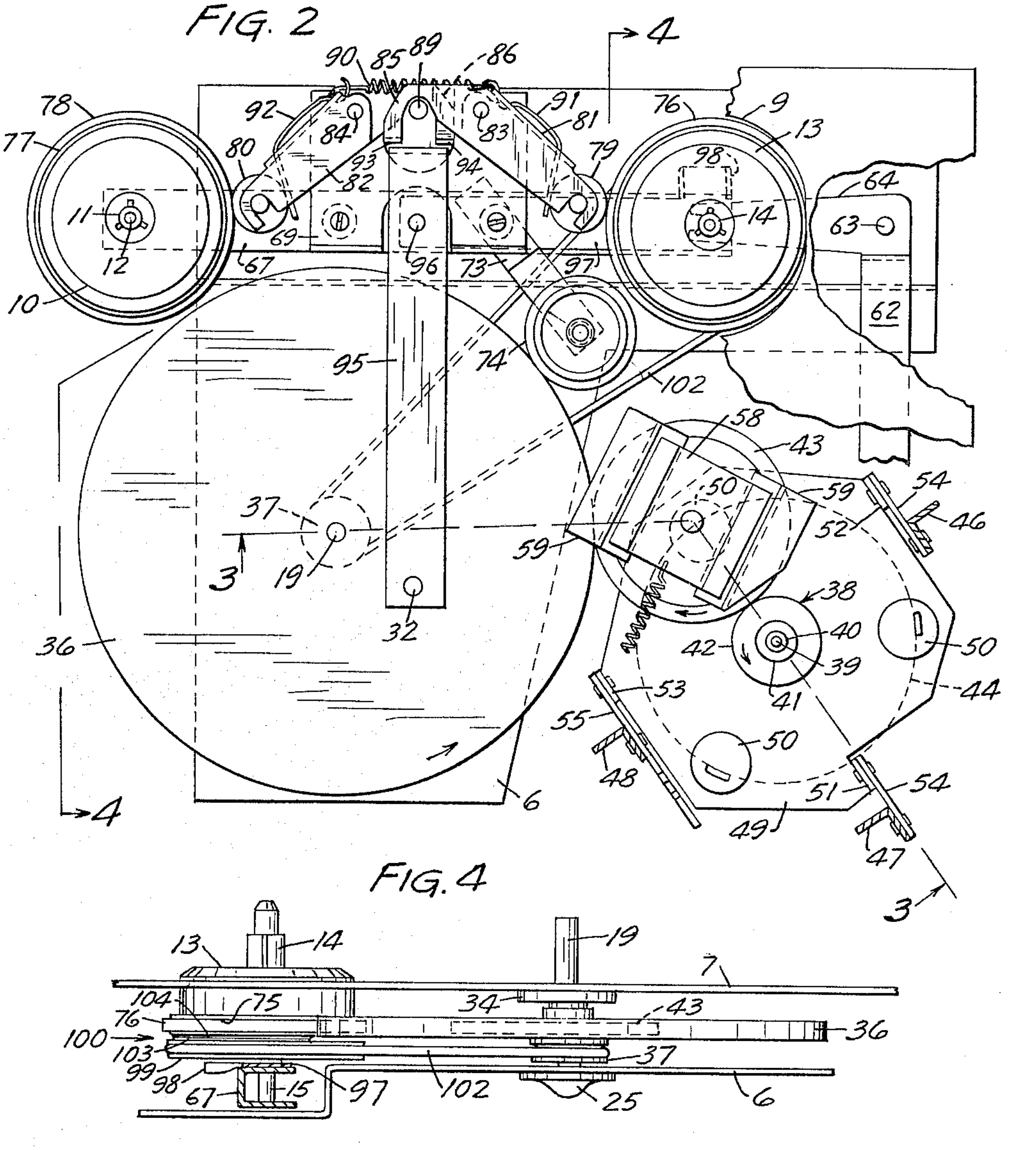
FIGURE 2 is another plan view of the tape recorder of FIGURE 1 with the top deck being broken away in part and with hidden parts shown in broken lines for purposes of description.
FIGURE 4 is a vertical sectional view taken generally along line 4—4 of FIGURE 2.

The drive means for the drive roller 38 includes a motor 44 having a driven shaft 45 to which said drive roller is secured. The motor 44 is movably mounted to the deck 7 through three perpendicularly depending angle brackets 46, 47 and 48. The motor 44 is secured to a mounting plate 49 by three circumferentially spaced resilient mounts 50. The plate 49 is formed with an upstanding ear or bracket 51 and two depending ears or brackets 52 and 53. The brackets 51 and 52 are each connected by a suitable pin to one end of a corresponding link 54, which links form part of a parallel linkage, translatable support for said motor to move the drive roller 38 through an arc in a predetermined vertical plane. The other ends of the links 54 are connected by suitable pins to the lower ends of the angle brackets 46 and 47 (see FIGS. 2 and 3). A third link of the parallel linkage support is in the form of a bell crank lever 55, connected at one end to the bracket 53 and connected intermediate its ends to the depending bracket 48 (FIGURE 2). The free end of the bell crank lever 55 projects upwardly through a slot 56 in the deck 7.

The projecting end of lever 55 forms the control arm for positioning the motor 44 and drive roller 38 to vary the rotational speed of the flywheel 36, capstan 19 and therefore the tape transport speed. The lever 55 cooperates with position holding means, in the form of a resilient, wire-form, detent 57 having a series of camlike surfaces and notches, to retain the lever 55 in a predetermined selected position and allowing adjustment thereof to another preselected position, each of which define a predetermined position of operation for the drive roller 38.

The idler wheel 43 is rotatably mounted on a support plate 58 which is floatably mounted below the deck 7 between angle brackets 59 which provide a space larger than said plate, permitting sliding movement thereof in a plane parallel to the deck 7. The plate is lightly biased toward the flywheel 36, by a spring 60 fixed thereto and suitably fixed to the deck 7 and/or by gravity if the recorder is operated with the deck 7 positioned vertically.

The idler wheel 43 is easily adjusted relative to the drive roller 38 when said roller 38 is moved up or down and particularly when said roller 38 is rotated. The idler wheel 43, due to its mounting, is self-adjusting to maintain the optimum engaging angle above-described affording a predetermined pressure contact, frictional driving engagement with the roller 38 and flywheel 36. If this engaging angle were allowed to increase upon moving the roller 38, the idler wheel 43 would tend to wedge between the drive roller 38 and the flywheel 36. If such wedging occurred, the energy losses in the drive system would increase, due to compression of the idler wheel 43 and increased loading on the bearings for the flywheel 36 and drive roller 38, resulting in variations in the rotational speed of the capstan 19 and in the tape transport speed. A decrease in this engaging angle may cause slippage between said idler wheel 43 and either said flywheel 36 or drive roller 38, or both and would also be objectionable. In the illustrated embodiment, the direction of rotation of the idler wheel 43, see the arrow in FIGURE 2, is such that a point on the periphery of said idler wheel passes from contact with said drive roller 38 to contact with said flywheel 36 through the engaging angle affording thereby good frictional driving engagement between said roller and flywheel.

The flywheel 36 acts as a drive roller during the advance and rewind functions of the illustrated apparatus. The advance and rewind functions are initiated by movement of an advance-rewind control knob 61 which is mounted on a bell crank lever 62. The bell crank lever 62 is pivotally mounted intermediate its ends on the lower deck 6 by the pin 63 and has a short arm 64 thereof bifurcated at its end to fit about the shaft 15. The other longer arm of the bell crank 62, carries the knob 61 and a cam actuating pin 65 which projects upwardly through an opening 66 in the top deck 7 for purposes to be hereinafter described.

Figure 5:
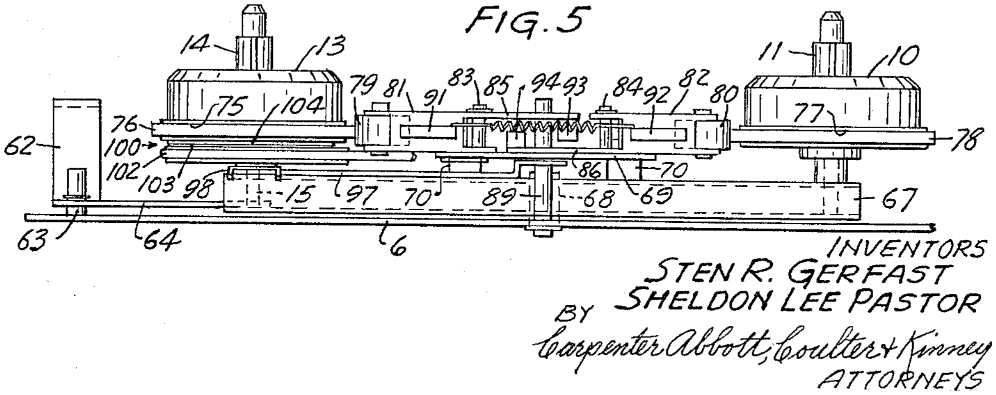
FIGURE 5 is a fragmentary rear elevation view of the recorder substantially as shown in FIGURE 2.

Swinging movement of the knob 61 and lever 62 pivots a channel-shaped elongate bar 67. The bar 67 is pivotally mounted on a portion of the deck 6 by means of a pin 68 (see FIGURE 5). The bar 67 supports the supply reel roller shaft 12 and the takeup reel roller shaft 15 adjacent opposite ends thereof and also supports a brake lever mounting plate 69 between the supply reel roller 10 and the takeup reel roller 13. The plate 69 is fixed to the bar 67 by means of suitable fastening means 70 comprising screws and spacer means, said spacer means being inserted between said plate 69 and said bar 67.

An arm 73, pivotally supported at one end on one of the fastening means 70, rotatably supports an idler wheel 74 on the other end thereof. The idler wheel 74 is formed at least in part of rubber-like material and is positioned for engagement with the outer periphery of the flywheel 36 and with the takeup reel roller 13. The takeup reel roller is provided with a groove 75, which is channel-shaped in cross-section, formed with a flat base and extends around the outer periphery thereof and is positioned generally in the plane of the flywheel 36 and receives therein a rubber-like ring 76 of rectangular cross-section forming the frictional driving surface. When the knob 61 is moved to the right as viewed in FIGURE 1, the bar 67 pivots clockwise bringing the idler wheel 74 into frictional driving engagement with the flywheel 36 and ring 76 on the takeup reel roller 13 to rotate said takeup reel roller counter-clockwise for rapidly advancing said tape.

When the knob 61 is moved to the left from the position shown in FIGURE 1, the bar 67 pivots about pin 68 counter-clockwise to place a rubber-like ring 78 mounted in a groove 77 on the supply reel roller 10 (see FIGURES 2, 5 and 6) in frictional driving engagement with the flywheel 36. This results in imparting clockwise rotation to the supply reel roller 10 for fast rewind.

Brake means are provided for engagement with the friction rings 76 and 78 of the reel supporting rollers 10 and 13 and operate at various times during the respective functions of the apparatus to stop the rotation of said rollers when the tape is not being moved. During the advance or rewind functions of the apparatus, pivotal movement of the bar 67, from its neutral position illustrated in FIGURE 2, affords an automatic release of the brake means for the reel supporting rollers 10 and 13. The brake means illustrated comprise a pair of rollers 79 and 80, each of which are mounted for rotation against a predetermined frictional force at one end of a pair of brake levers 81 and 82, respectively. The levers 81 and 82 are pivotally mounted on pins 83 and 84 fixed to the brake lever mounting plate 69. The other end of each of the brake levers 81 and 82 is formed with a plate-like extension 85 and 86, respectively, which are vertically spaced with the extension 85 overlaying the extension 86 and which are provided with identical notches as shown which define a pair of cam surfaces on each lever. A pin 89 is mounted on the deck 6 and projects upwardly through a cutaway portion in the brake plate 69 into the notches in each of the brake levers 81 and 82. The notches and the pin 89 are of such size, and are arranged such that when the bar 67 is pivoted in either direction, one cam surface of each of the brake lever extension plates 85 and 86 engages the pin 89 forcing the brake levers 81 and 82 to pivot in a direction drawing the brake means 79 and 80 away from frictional engagement with the rings 76 and 78 of the takeup reel roller 13 and the supply reel roller 10, respectively. Upon return movement of the bar 67 to the neutral position the pin 89 returns to a central position in the notches on the levers 81 and 82 and the brake rollers 79 and 80 are urged back into braking engagement by a helical tension spring 90 joining the ends of said levers adjacent said pin 89.

Each brake assembly exerts substantially no braking force when the element to be braked (roller 10 or roller 13) is rotating in the winding direction, and it exerts relatively high braking force when the braked element is rotating in the opposite or unwinding direction. The amount of braking force applied by the rollers 79 and 80 when biased against rings 76 and 78 under the force of helical tension spring 90 is minimal. The braking force necessary to decelerate the tape reels is provided by a self-energizing effect between the brake roller and reel roller, but in a nonabrupt manner as the braking force is limited to the braking action applied to the rollers 79 and 80 by leaf springs 91 and 92, which force has a constant, predetermined value to eliminate the possibility of tape distortion or breakage.

The brake lever extension plates 85 and 86 have oppositely bent end portions 93 and 94 which form abutment surfaces engageable with a bar 95 slidably mounted on the undersurface of the deck 7. The bar 95 is moved in the direction of its elongate dimension by the pin 32 connected to the pressure roller support lever 23 mentioned hereinabove. When the pressure roller 21 moves toward the capstan 19 to afford a driving engagement with the tape, the bar 95 strikes the surfaces 93 and 94 to pivot the brake levers 81 and 82 and retract the brake means 79 and 80.

The bar 95 additionally carries a pin 96 which depends from the end of said bar adjacent the brake levers. The pin 96 extends through a second cutaway portion in the brake support plate 69 and through a circular opening in one end of the pivoted clutch actuating arm 97, thereby pivotally connecting said arm 97 to the pressure roller support lever 23 for actuation therewith. The clutch arm 97 is pivotally mounted below the brake plate 69 on one of the fastening means 70 and carries a laterally extending wedge-shaped end portion 98 adjacent its opposite end. A belt pulley 99 is rotatably mounted below the takeup reel roller 13 and is adapted to be drivingly connected to said roller by an overriding clutch 100. The belt pulley 99 is journalled on the shaft 15 and is driven from the capstan shaft belt pulley 37 by a suitable belt 102. A felt-like covering 103 is applied to the upper circular surface of the pulley 99 and is adapted to engage a felt-like covering 104 applied to the under surface of the takeup reel roller 13, forming the clutch 100 therebetween sufficient to wind the tape on the takeup reel. Movement of the pressure roller 21 into tape driving engagement with the capstan 19 shifts the clutch arm 97 clockwise, as viewed in FIGURE 2, to force the wedge-shaped end portion 98 (FIGURE 4) into a position between the channel-shaped bar 67 and the undersurface of the pulley 99 to move the same upward, bringing the faces 103 and 104 of the clutch 100 into engagement. Suitable low friction washers may be placed on the shaft 15 between the end portion 98 and the undersurface of pulley 99.

The takeup reel drive means, provided by the belt 102 and clutch 100, during the normal record-reproduce functions, is established when the pressure roller 21 is moved into operating position with the capstan 19 to wind the tape on the takeup reel. Movement of the pressure roller into driving engagement simultaneously releases the brake means 79 and 80 due to the sliding movement of the bar 95 as aforesaid. Withdrawal of the pressure roller 21 interrupts the takeup reel drive and the brake means are automatically applied, and stop the rotation of the supply reel before the inertia thereof can cause any tape to be spilled therefrom.

When the bar 67 is pivoted bringing the friction rings 76 and 78 on the reel supporting rollers 10 and 13 into driving engagement with the flywheel 36, there is a tendency to stretch and distort the tape threaded between the reels because of the sudden acceleration involved, this is particularly true when the bar is suddenly pivoted, jamming the members into driving engagement. To avoid this, a slip clutch means is provided comprising a thin band 105 of low friction surface polymeric material, such as polytetrafluoroethylene (see FIGURE 5) placed in the base of the groove 77 encircling the supply reel roller 10 and a similar band is placed in the base of the corresponding groove 75 on the takeup reel roller 13. These bands 105 permit the friction rings 76 and 78 to rotate in the retaining grooves enough to relieve any tensile stress on the tape which would be sufficient to distort the same. The addition of this band 105 in the groove permits the use of conventional friction rings or tires, which are preferred structurally since they can be stretched and placed around the rollers providing a high friction drive surface thereon which is easily assembled due to the resilience of the rings and they are noise absorbing, to provide a low cost, safety device in the form of a slip clutch to limit acceleration to reduce the shock load on the tape.

As previously stated, movement of the advance-rewind control knob 61 moves the pin 65 projecting through an opening 66 in the top deck 7. The pin 65 bears against a cam surface 109 on a bell crank lever 110 biased into engagement with said pin 65 by a spring 111. The bell crank lever 110 is pivotally mounted on a pin 112 and is provided at its end, opposite the cam surface 109, with a latching surface 113 positioned for cooperating engagement with one end of the pressure roller lever 23 to lock the pressure roller 21 in disengaged position when the apparatus is shifted into the advance or rewind function. If it were possible to accidently move the pressure roller 21 into driving position during either the advance or rewind function the tape would be subjected to considerable immediate stress due to the relative speed of the tape as it is being wound on the supply or takeup reel and the speed it would be driven by the capstan and tape would spill from the unwinding reel since there would be nothing to stop its rotation.

Another locking, bell crank lever 114 is swingably mounted on a screw 116 holding bracket 26 and is biased by a spring 117 for counter-clockwise rotation to place a cam surface 118 thereof in engagement with the pin 65. The lever 114 is formed on one edge with stop surfaces 119, 120 and 121 opposite the lever receiving notches on the lever holding means or detent 57. The stop surfaces 119, 120 and 121 are connected by cam surfaces 122 and 123. In the neutral position of the advance-rewind control knob 61, as shown in FIGURE 1, the locking lever 114 is held out of engagement with the speed control lever 55. In either the advance or rewind positions of knob 61 the lever 114 is biased into engagement with manual control lever 55 such that a stop surface 119, 120 or 121 may engage lever 55, unless the lever 55 is in its rearmost position. In engaging position with lever 55 the locking lever 114 prevents lever 55 from being moved from a fast advance or rewind speed to a slower speed. That is, the locking lever with stop surfaces 119, 120 and 121, and cam surfaces 122 and 123 allow the operator to increase the winding speeds during the advance or rewind function but will prevent the operator from decreasing the transport speed without first moving the control knob 61 to its neutral position, in which the brake means 79 and 80 stop the rotation of the reel-supporting rollers 10 and 13 and the associated reels not shown. This locking lever 114 thus prevents the most inexperienced operator from spilling tape during these functions of the machine.

The illustrated apparatus is readily adapted for use with a conventional electrical audio system to provide a self-contained record-reproducing apparatus or is adapted for use with external audio equipment although such components have not been illustrated.

The drive mechanism above-described for use with transducing devices adds versatility to such devices and provides therefor an accurate, uncomplicated drive system using fewer parts to thus make such devices more economical. It is contemplated, however, that certain structural changes may be made in the illustrated apparatus, and all such structural changes and modifications as would be obvious to a person having ordinary skill in the art, are considered to come within the scope of the present invention.

What is claimed is:

1. A shiftable magnetic tape drive system affording adjustment of the tape transport speed to several predetermined speeds wherein the tape is transported past magnetic head means and between two reels, the system comprising in combination a rotatably mounted capstan shaft for driving the tape, a flywheel fixed to said capstan shaft and rotatable therewith, an idler wheel slidably supported for engagement of the periphery thereof with the peripheral surface of said flywheel, a drive roller having a plurality of axially spaced coaxial drive surfaces of different diameter, means for rotating said roller, means supporting said roller for selectively positioning said drive surfaces in a driving position in the plane of said idler wheel and for varying the spatial relationship of the axis of said roller and the axis of said flywheel as each surface is placed in said driving position, means for maintaining said idler wheel in frictional driving engagement with a selected drive surface of said roller and said flywheel, said supporting and positioning means for said drive roller and said means for maintaining said idler wheel being such that in each selected driving position a line between the center of said flywheel and the center of said idler wheel forms the same obtuse angle with a line between the center of the idler wheel and the center of said drive roller, and said positioning means comprising manually operable lever means and means for locking said lever means in said selected driving positions.

2. An alternate speed tape drive system for use with a recorder-reproducer wherein the tape is transported past magnetic head means and between two reels, the combination comprising a rotatably mounted capstan shaft for driving the tape, a flywheel fixed to said capstan shaft and rotatable therewith, an idler wheel supported adjacent said flywheel and biased into rotational engagement with the periphery of said flywheel, a drive roller having stepped coaxial cylindrical drive surfaces of different diameter, means for rotating said roller in one direction, means for positioning said cylindrical surfaces of the roller in selective rotational driving engagement with the periphery of said idler wheel such that in each driving position of said roller a line between the roller axis and the idler wheel axis forms substantially the same optimum obtuse angle with a line between the idler wheel axis and the flywheel axis, and the position of said idler wheel and its direction of rotation being such that a point on the periphery of said idler wheel passes from contact with said drive roller to contact with said flywheel through said obtuse angle, and means for retaining said drive roller in said driving positions.

3. An alternate speed tape drive system for use with a recorder-reproducer wherein the tape is transported past magnetic head means and between two reels, the combination comprising a rotatably mounted capstan shaft for driving the tape, a flywheel fixed to said capstan shaft and rotatable therewith, an idler wheel supported adjacent said flywheel and biased into rotational engagement with the periphery of said flywheel, a drive roller having stepped coaxial cylindrical drive surfaces of different diameter, a motor having a driven shaft, said drive roller being mounted on said driven shaft for rotation therewith in one direction, parallel linkage means supporting said roller and said motor for selectively positioning a said cylindrical surface of the roller in rotational driving engagement with the periphery of said idler wheel such that in each driving position a line between the roller axis and the idler wheel axis forms substantially the same obtuse angle with a line between the idler wheel axis and the flywheel axis, and the position of said idler wheel and its direction of rotation being such that a point on the periphery of said idler wheel passes from contact with said drive roller to contact with said flywheel through said obtuse angle, and means for retaining said drive roller in said driving positions.

4. A drive system for a magnetic tape transducing apparatus which will provide changes in the tape transport speed during the play-record, advance or rewind functions comprising in combination a supporting frame, a capstan shaft rotatably supported on said frame, a flywheel supported by and rotatable with said capstan shaft, a motor having a driven shaft, a drive roller having a plurality of stepped coaxial cylindrical drive surfaces of different diameter mounted for rotation on said driven shaft, linkage means mounting said motor and said drive roller for translational movement on said frame to selectively position one of said drive surfaces in driving relation with said flywheel to drive said flywheel and said capstan shaft at a selected speed, a supply reel-supporting roller and a takeup reel-supporting roller each of which are connected to a spindle adapted to support a reel being rotatably mounted on said frame, means affording a driving connection between a said reel-supporting roller and said flywheel, shiftable lever means connected to said linkage means affording movement of said motor and said drive roller to change the speed of rotation of said flywheel and a said reel-supporting roller by moving another of said different diameter drive surfaces on said drive roller into driving relation with said flywheel, and control means connected with said means affording said driving connection and with said shiftable lever means to prevent movement of said lever means in a direction which would result in a reduction in the rotational speed of said driven reel-supporting roller after said means affording said driving connection is actuated.

5. A drive system for a magnetic tape transducing apparatus which will provide changes in the tape transport speed during the play-record, advance or rewind functions comprising in combination a supporting frame, a capstan shaft rotatably supported on said frame, a flywheel supported by and rotatable with said capstan shaft, a motor having a driven shaft, a drive roller having a plurality of stepped coaxial cylindrical drive surfaces of different diameter mounted for rotation on said driven shaft, linkage means mounting said motor and said drive roller for translational movement on said frame to selectively position one of said drive surfaces in driving relation with said flywheel to drive said flywheel and said capstan shaft at a selected speed, a supply reel roller and a takeup reel roller each of which are connected to a spindle adapted to support a reel, a bar pivotally mounted on said frame, said reel-supporting rollers being rotatably mounted on said bar for movement therewith toward and away from said flywheel, actuating means for pivoting said bar on said frame from a neutral position to a drive position moving one of said reel-supporting rollers toward said flywheel to place the same in driving position therewith to effect the rotation of said reel-supporting roller, shiftable lever means connected to said linkage means affording movement of said motor and said drive roller to change the speed of rotation of said one reel-supporting roller by moving another of said drive surfaces on said drive roller into driving relation with said flywheel, and interlocking means operable upon movement of said actuating means to restrict movement of said lever means such that said lever means can be moved only in a direction increasing the rotative speed of said one reel-supporting roller.

6. In a transducing apparatus having means for forward and reverse searching wherein a tape is transported between two reels, the combination comprising a frame, a rotating drive roller, a supply reel roller and a takeup reel roller each of which are rotatably mounted on said frame and are connected to a spindle adapted to support a reel, at least one of said reel-supporting rollers being formed of material having a relatively high coefficient of friction, a ring formed of rubber-like high coefficient of friction material being placed around the outer periphery of said reel-supporting roller to form a drive surface on the periphery thereof, means affording a frictional driving connection between said drive roller and said ring, and acceleration limiting means comprising a band of material having a low coefficient of friction surface being disposed between said reel-supporting roller and said ring decreasing the frictional contact between said ring and said reel-supporting roller to relieve the shock on the tape to an amount below that which would deleteriously affect the tape when said means affording a driving connection is actuated placing said one of said reel-supporting rollers in frictional driving contact with said drive roller.

7. In a transducing apparatus having means for forward and reverse searching wherein a tape is transported between two reels, the combination comprising a frame, a rotating drive roller, a supply reel roller and a takeup reel roller each of which are rotatably mounted on said frame and are connected to a spindle adapted to support a reel, each of said reel-supporting rollers being formed with a peripheral groove and being formed of a material having a relatively high coefficient of friction, a ring formed of rubber-like high coefficient of friction material being placed in each said groove around the outer periphery of said reel-supporting rollers to form drive surfaces thereon, means selectively affording a frictional driving connection between said drive roller and one of said rings, and acceleration limiting means comprising a band of material having a low coefficient of friction surface being disposed in each said groove between said reel-supporting roller and said cooperating ring decreasing the frictional contact between said rings and said reel-supporting rollers to relieve the shock on the tape whenever said means affording a driving connection is actuated.

8. A drive system for a magnetic tape transducing apparatus which will provide changes in the tape transport speed during the play-record, advance or rewind functions comprising in combination a supporting frame, a capstan shaft rotatably supported on said frame, a flywheel supported by and rotatable with said capstan shaft, a motor driven shaft, a drive roller having a plurality of concentric, axially spaced, peripheral drive surfaces of different diameter mounted for rotation with said driven shaft, means mounting said driven shaft and said roller for movement on said frame to selectively position a said drive surface in driving relation with said flywheel to drive said flywheel and said capstan shaft at a selected speed, a supply reel roller and a takeup reel roller each of which are rotatably mounted on said frame and are connected to a spindle adapted to support a reel, means affording a frictional driving connection selectively between one of said reel-supporting rollers and said flywheel, said reel-supporting rollers having a ring of high coefficient of friction material mounted around the outer periphery thereof affording the friction drive surface for said reel-supporting rollers, slip clutch means between said rings and said rollers to relieve the shock on a said tape when said means affording the driving connection is operative, and manually operated lever means affording controlled movement of said driven roller to change the speed of rotation of said selected one of said reel-supporting rollers by moving another drive surface on said drive roller into driving relation with said flywheel.

9. A variable speed tape drive system for use in a sound recording-reproducing apparatus wherein a tape is transported past magnetic head means, between two reels, by a rotatably mounted capstan having a flywheel rotatable therewith, and alternate speed drive means for said flywheel, the improvement comprising the combination of a drive roller having a plurality of coaxial cylindrical drive surfaces of varying diameter positioned with the axis thereof parallel to the axis of a said flywheel, motor means for rotating said roller, means mounting said roller and motor means for translational swinging movement to move said roller axially and toward or away from said flywheel to selectively place a different one of said drive surfaces in a drive position in the plane of said flywheel, and an idler wheel slidably mounted in the plane of said flywheel and urged into engagement with said roller and said flywheel, whereby substantially the same angular relationship exists between a first line connecting the axis of said roller and the axis of said idler wheel and a second line connecting the axis of said flywheel and the axis of said idler wheel in all drive positions of the roller with respect to said flywheel.

References Cited by the Examiner

UNITED STATES PATENTS

| | | | |
|---|---|---|---|
| 2,873,926 | 2/1959 | Roberts | 242—55.12 |
| 2,877,958 | 3/1959 | Moore et al. | 242—55.12 |
| 2,927,743 | 3/1960 | Shatavsky | 242—55.12 |
| 3,090,574 | 5/1963 | Doncaster et al. | 242—55.13 |

FOREIGN PATENTS

| | | |
|---|---|---|
| 1,170,976 | 9/1958 | France. |
| 873,588 | 7/1961 | Great Britain. |
| 933,179 | 8/1963 | Great Britain. |

FRANK J. COHEN, *Primary Examiner.*

GEORGE F. MAUTZ, *Examiner.*